United States Patent
Crislip et al.

(10) Patent No.: US 12,346,394 B1
(45) Date of Patent: Jul. 1, 2025

(54) SYSTEMS AND METHODS FOR MICRO FRONT END COMPONENT ROUTING USING QUERY PARAMETERS

(71) Applicant: Capital One Services, LLC, McLean, VA (US)

(72) Inventors: Don Crislip, McLean, VA (US); Lathan Carter, Aubrey, TX (US); Liju Mathews, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/668,115

(22) Filed: May 17, 2024

(51) Int. Cl.
    *G06F 16/9535* (2019.01)
    *G06F 16/9538* (2019.01)
    *G06F 16/958* (2019.01)

(52) U.S. Cl.
    CPC ...... *G06F 16/9538* (2019.01); *G06F 16/9535* (2019.01); *G06F 16/958* (2019.01)

(58) Field of Classification Search
    CPC .. G06F 16/951; G06F 16/958; G06F 16/9535; G06F 16/9538; G06F 16/9536
See application file for complete search history.

(56) References Cited

U.S. PATENT DOCUMENTS

| | | | | |
|---|---|---|---|---|
| 9,720,672 | B2 * | 8/2017 | Lipton | G06F 8/61 |
| 10,104,051 | B2 * | 10/2018 | Kaipu | G06F 16/14 |
| 11,461,419 | B2 * | 10/2022 | Zimmerman | G06F 16/9535 |
| 2014/0006370 | A1 * | 1/2014 | Keshri | G06F 16/9538 |
| | | | | 707/706 |
| 2015/0026212 | A1 * | 1/2015 | Fink | G06F 16/951 |
| | | | | 707/774 |
| 2015/0293977 | A1 * | 10/2015 | Perl | G06Q 30/0273 |
| | | | | 705/14.54 |
| 2017/0193107 | A1 * | 7/2017 | Imbruce | G06F 16/9535 |

\* cited by examiner

*Primary Examiner* — Kris E Mackes
(74) *Attorney, Agent, or Firm* — Foley & Lardner LLP

(57) ABSTRACT

Methods and systems for routing micro front ends on a web page using query parameters to perform deep linking. In some aspects, the system determines a set of web applications to be included in a micro front end to generate for display information for a web page. For each web application, the system determines a set of components and uses a query parameter to associate the web application with a component via a deep link. In response to detecting a first user action, the system determines a requested update to a first web application in the set of web applications and identifies a substitute component for the first web application. The system adjusts a query parameter associated with the first web application to correspond to a deep link for the substitute component and updates the content of the web page with the adjusted query parameter.

20 Claims, 4 Drawing Sheets

SYSTEMS AND METHODS FOR MICRO FRONT END COMPONENT ROUTING USING QUERY PARAMETERS

SUMMARY

Methods and systems are described herein for novel uses and/or improvements to web routing for micro front ends. As one example, methods and systems are described herein for using query parameters to provide deep links to components of web applications.

Traditionally, web routing is done between different web pages. This architecture is poorly suited to the micro front end framework because micro front end web pages depend on a collection of applications, each executing its own programs, displaying data from different sources and maintaining separate connections to outside servers. To operationalize the range of components on a micro front end, the browser suffers from heavy computational loads and complex routing needs, which diminish the user experience.

Conventionally, routers have poor adaptability with each other, especially lacking the ability to sub-route within a web page. This limits the functionality of web applications, affecting the range of data and functionalities displayed, and is particularly cumbersome when switching components within a micro front end because each changed component requires a re-route of the entire main page.

The systems and methods described herein solve the rigidity of conventional web page routing by providing interactive elements in a micro front end and allowing dynamic, nimble adjustments to components in web applications through query parameters. Systems and methods described herein use query parameters to specify deep links to components, reducing the load on the main web page route and eliminating the need to reload the main web page upon adjustments to web application display content.

In some aspects, methods and systems are described herein comprising: determining a set of web applications to be included in a micro front end to generate for display information for a web page, wherein the web page is associated with a first uniform resource locator and a first set of query parameters; for each web application in the set of web applications: determining a set of components, wherein a component supplies its web application with content, and wherein each component is associated with a deep link; and using a query parameter in the first set of query parameters to associate the web application with a component by sub-routing the query parameter to correspond to the deep link; generating for display the web page with the set of web applications by displaying the component associated with each web application in the set of web applications; in response to detecting a first user action, determining a requested update to a first web application in the set of web applications; based on the requested update, identifying a substitute component for the first web application, wherein the substitute component contains content or programming corresponding to the requested update; adjusting a query parameter associated with the first web application to correspond to a deep link for the substitute component; and updating the content of the web page with the adjusted query parameter, wherein the updated content of the web page maintains the first uniform resource locator.

Various other aspects, features, and advantages of the systems and methods described herein will be apparent through the detailed description and the drawings attached hereto. It is also to be understood that both the foregoing general description and the following detailed description are examples and are not restrictive of the scope of the systems and methods described herein. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments described herein. It will be appreciated, however, by those having skill in the art that the embodiments may be practiced without these specific details or with an equivalent arrangement. In other cases, well-known structures and devices are shown in block diagram form to avoid unnecessarily obscuring the embodiments.

Figure 1:
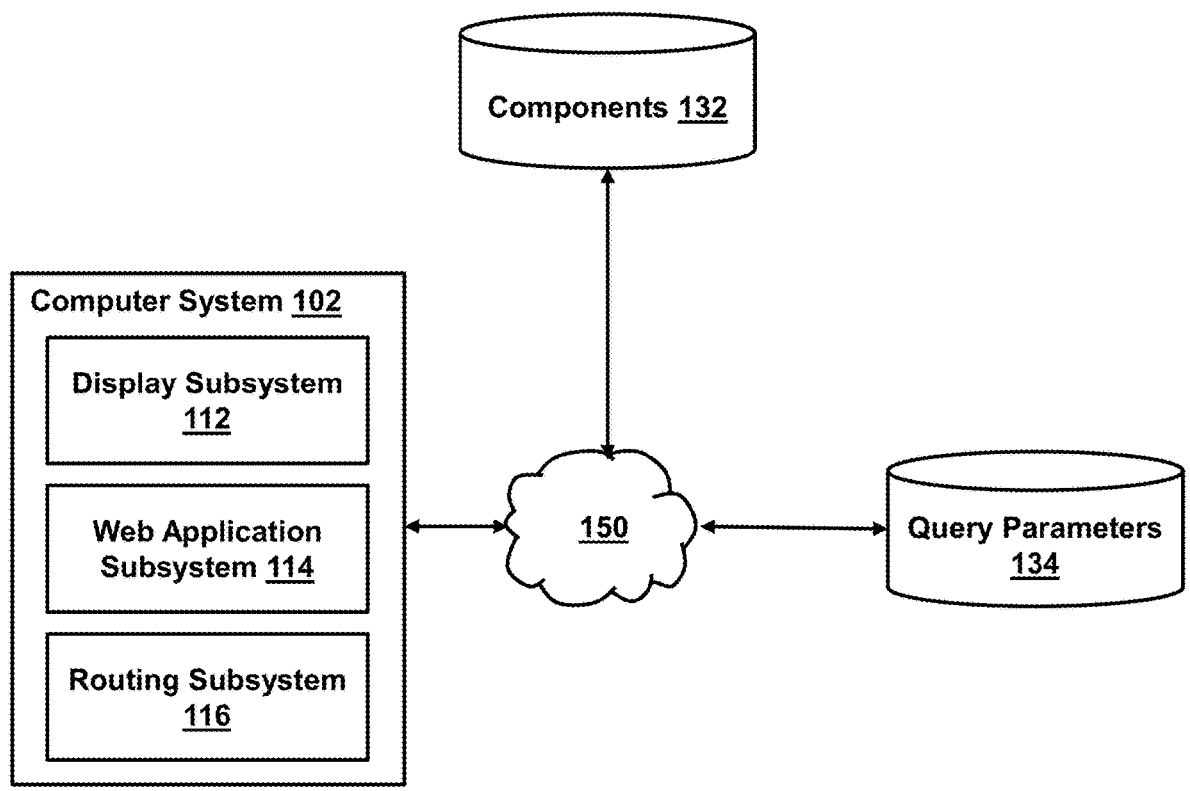
FIG. 1 shows an illustrative diagram for a system for routing micro front ends on a web page using query parameters to perform deep linking, in accordance with one or more embodiments.

FIG. 1 shows an illustrative diagram for system 150, which contains hardware and software components for a flexible routing method for micro front ends on a web page using query parameters to perform deep linking, in accordance with one or more embodiments. For example, Computer System 102, a part of system 150, may include Display Subsystem 112, Web Application Subsystem 114, and Routing Subsystem 116. System 150 may create, store, retrieve information from, or otherwise interact with Components 132 and Query Parameters 134.

The system (e.g., Display Subsystem 112) may determine a set of web applications to be included in a micro front end to transmit for display information for a web page. The web page is associated with a first uniform resource locator and a first set of query parameters. Micro front ends are an architectural approach used in web development to build large and complex applications by breaking them down into smaller, independent, and loosely coupled parts. Each part, known as a web application, is developed, deployed, and maintained by a separate development team and may be hosted on separate servers. The micro front end allows for faster development, easier maintenance, and improved scalability. Micro front ends communicate with their components through well-defined APIs and interfaces. This loose coupling allows for greater flexibility and reduces dependencies between different parts of the application. Web applications are integrated into the main front end through a shell or container. This shell provides the structure and layout for combining the individual applications into a cohesive user interface. Each web application in micro front end may present its own content using components, and changes to one web application need not affect others. The micro front end may constitute part or all of the web page. The set of query parameters associated with the micro front end may be used to represent a deep link pointing to a functionality, such as a component of a web application.

For each web application in the set of web applications, the system (e.g., Web Application Subsystem 114) determines a set of components from among Components 132 and uses a query parameter from Query Parameters 134 to associate the web application with a component by sub-routing the query parameter to correspond to the deep link. A component supplies its web application with content, and each component is associated with a deep link. A deep link is a hyperlink that links to a specific, generally searchable or indexed, piece of web content on a web page. For example, a deep link may correspond to a view of a web application with a specific component being displayed with information specified by the query parameters of the deep link. A query parameter corresponding to a deep link may be used by a web application's routing mechanism to route the web page to the functionality specified by the query parameter. This routing can be handled server-side or client-side using frameworks like React Router, Vue Router, or Angular Router. For example, a query parameter of "projects?id=123" may cause the web page to initiate an API call to retrieve information from a server-hosted component for a web application. The component may be a database containing information on projects managed through the database. In particular, the component may return information to the web application relating to a project with the identifier of 123.

Display Subsystem 112 generates for display the web page with the set of web applications by displaying the component associated with each web application in the set of web applications. Displaying a set of micro frontends on a web page involves orchestrating the integration of individual micro frontend modules into a cohesive user interface. The system may cause a shell or container application to be loaded in the user's browser, which acts as the main entry point for the micro front end web applications. The shell then fetches the required micro front end components to supply web applications with content, which are often hosted on separate servers or repositories, using asynchronous HTTP requests or module loaders like webpack. Once the micro front end components are fetched, they are dynamically loaded into the shell's DOM (Document Object Model), usually within designated container elements or components. This loading process may include initializing the micro frontends, passing configuration or state data, and setting up communication channels between the shell and micro frontends through well-defined APIs or messaging protocols. Finally, the shell orchestrates the layout and rendering of the micro frontends within the user interface, ensuring they work together seamlessly while maintaining their independence and encapsulation. Techniques like lazy loading, preloading, and caching can be employed to optimize performance and user experience when dealing with multiple web applications on a single web page.

In response to detecting a first user action, Web Application Subsystem 114 determines a requested update to a first web application in the set of web applications. For example, the first user action may interact with the web page to indicate a requested change. For example, the first user action may be a cursor click on an element corresponding to a request for expanded content for an existing component for a web application. In another example, the first user action may indicate to close a tab in a display of a web application. The system may determine a requested update by corresponding the user action to a component in a web application and determining a functionality corresponding to the component based on the user action. Functionalities may include adding content, removing content, replacing content, and dynamically updating content. The system may determine the functionality based on pre-programmed logic of the web application or the component. In some embodiments, the system may determine to replace a component for the web application.

Based on the requested update, Web Application Subsystem 114 identifies a substitute component for the first web application. The substitute component contains, for example, content or programming corresponding to the requested update. The system may select the substitute component by, for example, determining capability and functional requirements of the first web application. The system may determine capability requirements of the web page. For example, an amount of network bandwidth allocated to the first web application, a CPU power percentage, an I/O count allocation, and other computational limits may restrict the range of substitute components suitable for the web application. Additionally, the system determines a software compatibility requirement of the web page, including inter-operability requirements with other web applications in the micro front end, and selects a substitute component that satisfies the software compatibility requirement. For example, the system may select a component programmed using the Angular framework if the web application has other components also using the Angular framework. Additionally or alternatively, the system may select the substitute component based on functional requirements. The functional requirements may describe content to be displayed by the substitute component and responses to be made in response to user actions. For example, a functional requirement for the substitute component may be that a graphic must be interactable within the substitute component, being able to reflect different information in response to user input.

The system (e.g., Routing Subsystem 116) adjusts a query parameter (e.g., from Query Parameters 134) associated with the first web application to correspond to a deep link for the substitute component. For example, the system may re-select a query parameter from the set of query parameters. For example, whereas a web application used a query parameter of "projects?id=123" to identify a component for supplying information before the requested change, the system may change the query parameter to "projects?id=145" in response to a requested change that, for example, indicates different content should be displayed. Routing Subsystem 116 may fetch a substitute in the list of components available to the web application, and find an associated query parameter of the substitute component. In some embodiments, each web application is associated with a set of query parameters, where the set of query parameters indicate suitable components for the web application. For example, the set of query parameters may correspond to components that are selected for compliance with functional and/or content requirements of the web application. For example, the system may rank the set of components for a web application based on a measure of suitability and/or computational load.

Display Subsystem 112 updates the content of the web page with the adjusted query parameter, wherein the updated content of the web page maintains the first uniform resource locator. For example, Routing Subsystem 116 may use a deep link corresponding to the adjusted query parameter to provide the web application with content from the substitute component. In some embodiments, the web page may automatically reflect the content without the need to re-load or re-route at the client side. For example, the server may provide a different response to the web application based on the adjusted query parameter. In some embodiments, the adjusted query parameter causes the system to communicate with a different server in order to retrieve the content of the substitute component. The web page may update its display in a user interface. On the client side, web applications can utilize client-side scripting languages like JavaScript to dynamically update the user interface with substitute content based on the server response.

Figure 2:
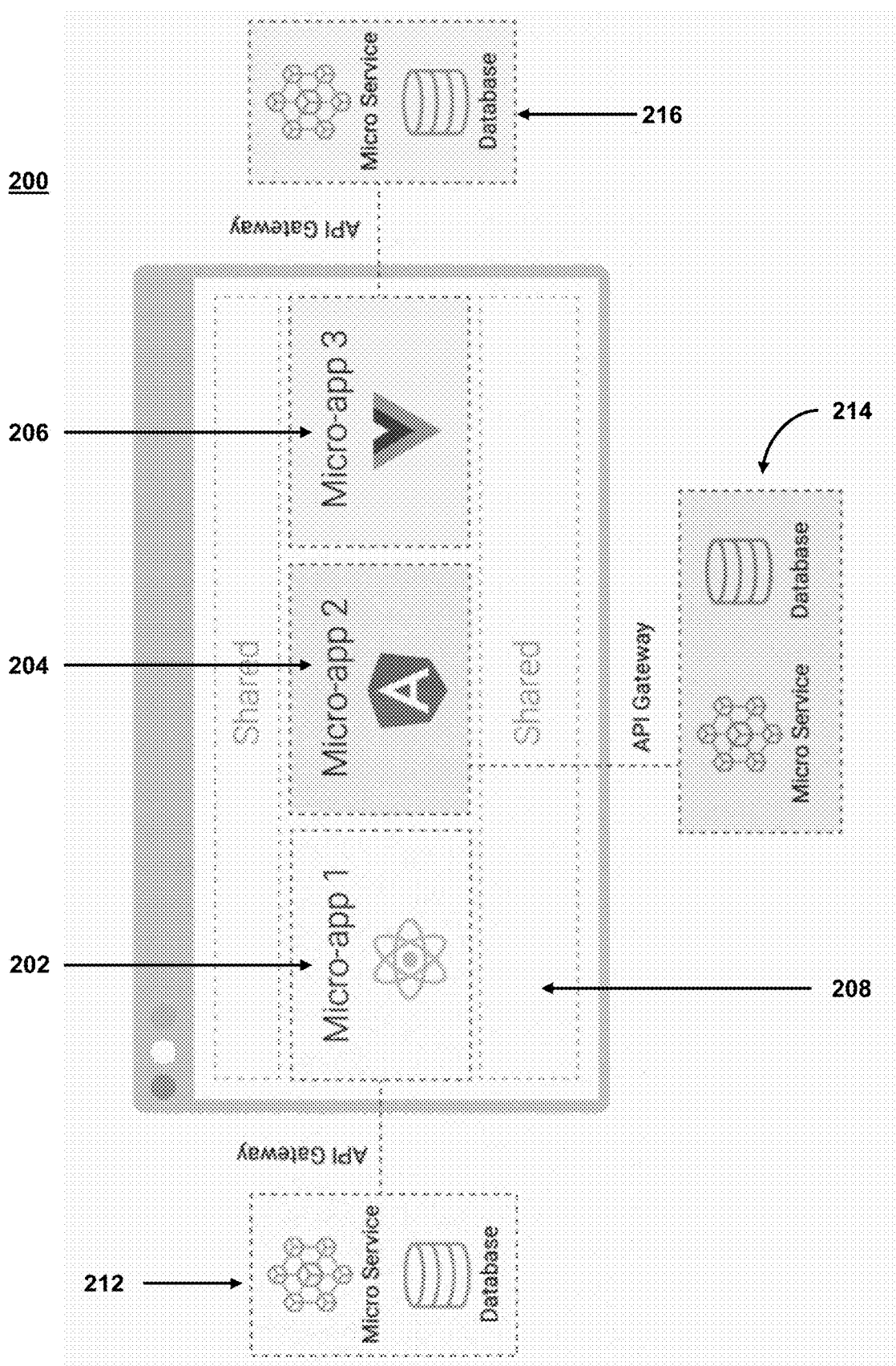
FIG. 2 shows a micro front end displaying various web applications supported by back-end infrastructure, in accordance with one or more embodiments.

FIG. 2 shows an example micro front end displayed on a web page, consisting of a set of web applications. For example, Micro Front End 200 includes a set of web applications simultaneously displayed on a web page in a side-by-side view, where all the web applications use the shared uniform resource locator of the web page. For example, Web Application 202, Web Application 204, and Web Application 206 may be developed using separate frameworks and may correspond to different back-ends.

Web Application 202 may use the React.js web development framework. React.js is an open-source JavaScript library used for building user interfaces and single-page applications. Web Application 202 follows a component-based architecture, allowing developers to create reusable and composable UI components that encapsulate both structure and behavior. React.js employs a virtual DOM (Document Object Model) for efficient rendering, where changes to the UI are first applied to the virtual DOM, and then React performs a differential update to the actual DOM, minimizing DOM manipulation overhead and improving performance. React uses JSX (JavaScript XML) syntax, which allows developers to write HTML-like code within JavaScript, enhancing readability and maintainability. Additionally, Web Application 202 may achieve integration among its web components and with other web applications using component state and context APIs, routing with React Router, and integration with other libraries and frameworks. Web Application 202 may be supported by Backend 212, including a set of components and a database. storing and managing application data. Web applications use backend databases such as Backend 212 through APIs or services, using technologies like RESTful APIs or GraphQL to retrieve, update, and manipulate data. The backend database may be relational (e.g., MySQL, PostgreSQL) or NoSQL (e.g., MongoDB, Cassandra), depending on the application's requirements for data structure, scalability, and performance. Web applications also use backends to retrieve components are self-contained and reusable UI elements that encapsulate HTML, CSS, and JavaScript logic.

Web Application 204 may be based on the Angular web application framework. It may be written in TypeScript to build dynamic and interactive single-page applications as well as large-scale enterprise applications. Angular follows the Model-View-Controller (MVC) architecture, where components are the building blocks of the application's UI. Components encapsulate HTML templates, TypeScript code for logic and data handling, and stylesheets, providing a modular and reusable structure. Angular's two-way data binding synchronizes the data between the model and the view, ensuring real-time updates without manual DOM manipulation. The framework also offers features like dependency injection for managing application-wide services, routing for navigation between views, forms module for handling user input and validation, HTTP client module for making API requests, and observables for handling asynchronous data streams. Angular's ahead-of-time (AOT) compilation optimizes performance by pre-compiling templates during build time, reducing runtime overhead and improving loading speed. Additionally, Angular provides a CLI (Command Line Interface) tool for scaffolding projects, generating components, services, and modules, and automating common development tasks, making it a robust and efficient framework for building modern web applications. Backend 214 provides components and data for Web Application 204 in much the same way that Backend 212 supports Web Application 202, although possibly using different programming languages or paradigms.

Web Application 206 may be based on the Vue.js web development framework, JavaScript framework used for building user interfaces and web applications. Vue.js is known for its simplicity, flexibility, and ease of integration with other libraries and projects. It follows a component-based architecture, where UIs are built using reusable and composable components that encapsulate HTML templates, JavaScript logic, and styles. Vue.js utilizes a virtual DOM (Document Object Model) similar to React, enabling efficient rendering by only updating the parts of the DOM that have changed. Vue's reactivity system automatically tracks dependencies between data properties and updates the UI accordingly, making data binding and state management straightforward. The framework provides features like directives for adding behavior to elements, computed properties for derived data, watchers for reacting to data changes, and Vuex for managing state in larger applications. Vue Router facilitates client-side routing for SPAs, while Vue CLI offers a command-line interface for project scaffolding, development, and build optimizations. Web Application 206 may be supported by its corresponding back end (e.g., Backend 216).

Micro Front End 200 may synthesize the web applications and coordinate the display of their content and data in the same user interface. Additionally, Micro Front End 200 may display Web Elements 208, a static web element containing code, content or logic such as HTML scripting. Web Elements 208 may be intended to provide a visual display tying together the web applications shown in Micro Front End 200. Web Elements 208 may generate for display in a user interface the graphic elements that serve as introductions, backgrounds, or other material to create a coherent user experience.

Figure 3:
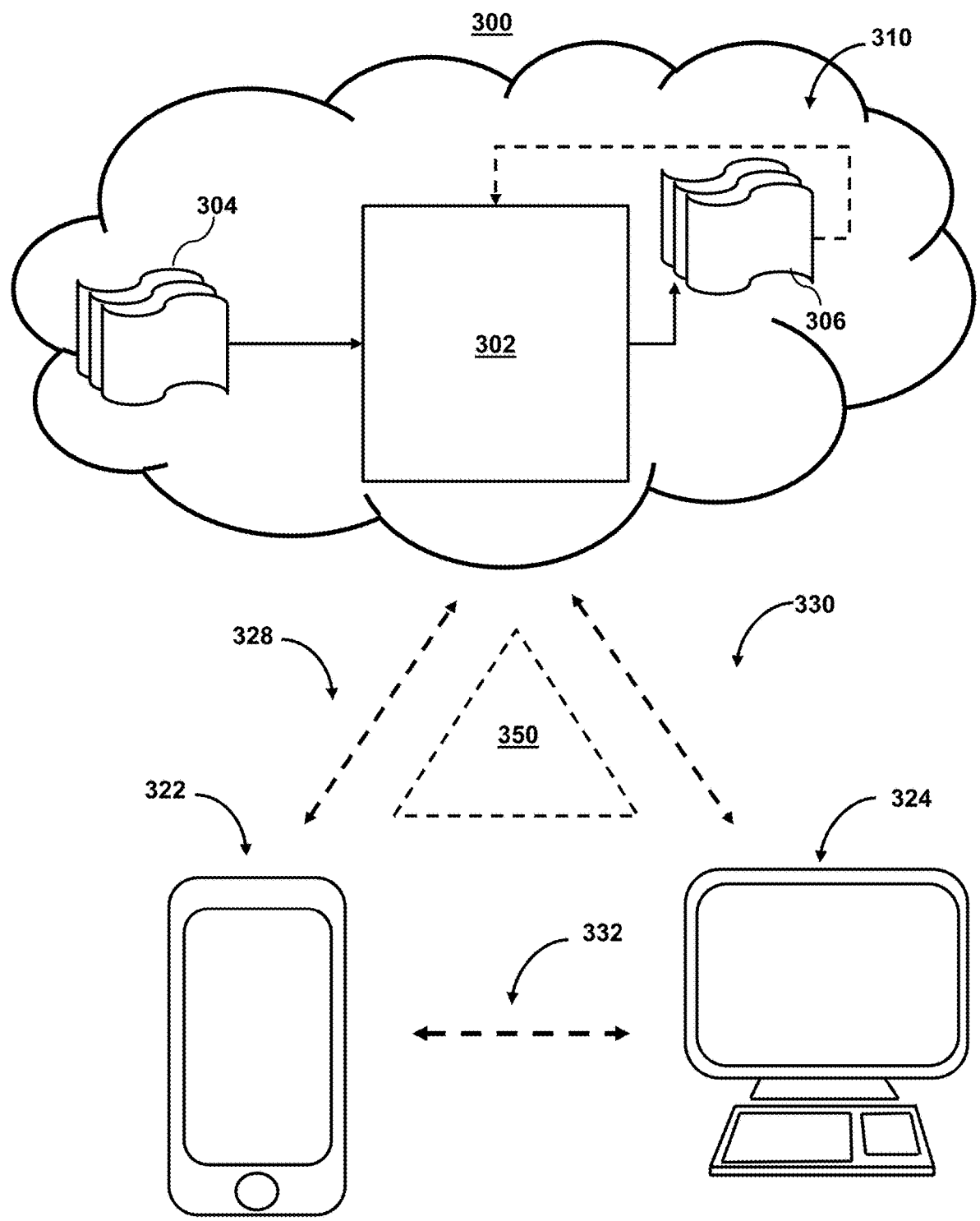
FIG. 3 shows illustrative components for routing micro front ends on a web page using query parameters to perform deep linking, in accordance with one or more embodiments.

FIG. 3 shows illustrative components for a system used to communicate between the system and user devices and collect data, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction. For example, model 302 may be used to generate content for display in one or more web applications.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output. Model 302, when trained, may, for example, generate classifications to supply web components with content.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDOS protection, and API layer 350 may use RESTful APIs as standard for external integration.

Figure 4:
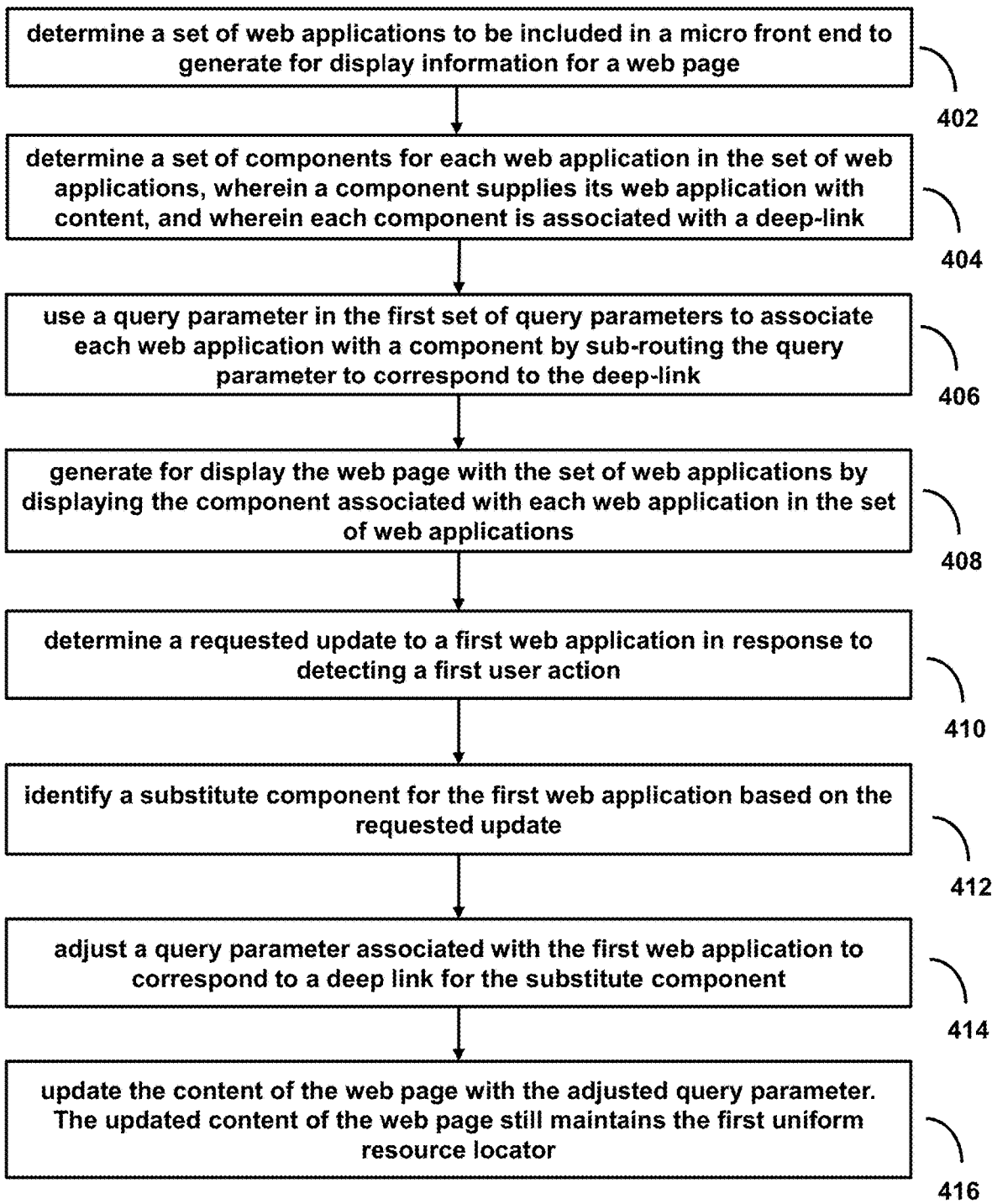
FIG. 4 shows a flowchart of the steps involved in routing micro front ends on a web page using query parameters to perform deep linking, in accordance with one or more embodiments.

FIG. 4 shows a flowchart of the steps involved in providing search query responses using adjacent keywords and search filters, in accordance with one or more embodiments. For example, the system may use process 400 (e.g., as implemented on one or more system components described above) in order to provide routing to micro front ends on a web page using query parameters to perform deep linking.

At step 402, process 400 (e.g., using one or more components described above) determines a set of web applications to be included in a micro front end to generate for display information for a web page. The web page is associated with a first uniform resource locator and a first set of query parameters. The system (e.g., Display Subsystem 112) may determine a set of web applications to be included in a micro front end to transmit for display information for a web page. The web page is associated with a first uniform resource locator and a first set of query parameters. Micro front ends are an architectural approach used in web development to build large and complex applications by breaking them down into smaller, independent, and loosely coupled parts. Each part, known as a web application, is developed, deployed, and maintained by a separate development team and may be hosted on separate servers. The micro front end allows for faster development, easier maintenance, and improved scalability. Micro front ends communicate with their components through well-defined APIs and interfaces. This loose coupling allows for greater flexibility and reduces dependencies between different parts of the application. Web applications are integrated into the main front end through a shell or container. This shell provides the structure and layout for combining the individual applications into a cohesive user interface. Each web application in micro front end may present its own content using components, and changes to one web application need not affect others. The micro front end may constitute part or all of the web page. The set of query parameters associated with the micro front end may be used to represent a deep link pointing to a functionality, such as a component of a web application.

At step 404, process 400 (e.g., using one or more components described above) determines a set of components for each web application in the set of web applications. A component supplies its web application with content, and each component is associated with a deep link. For each web application in the set of web applications, the system (e.g., Web Application Subsystem 114) determines a set of components from among Components 132 and uses a query parameter from Query Parameters 134 to associate the web application with a component by sub-routing the query parameter to correspond to the deep link. A component supplies its web application with content, and each component is associated with a deep link. A deep link is a hyperlink that links to a specific, generally searchable or indexed, piece of web content on a web page. For example, a deep link may correspond to a view of a web application with a specific component being displayed with information specified by the query parameters of the deep link.

At step 406, process 400 (e.g., using one or more components described above) uses a query parameter in the first set of query parameters to associate each web application with a component by sub-routing the query parameter to correspond to the deep link. A query parameter corresponding to a deep link may be used by a web application's routing mechanism to route the web page to the functionality specified by the query parameter. This routing can be handled server-side or client-side using frameworks like React Router, Vue Router, or Angular Router. For example, a query parameter of "projects?id=123" may cause the web page to initiate an API call to retrieve information from a server-hosted component for a web application. The component may be a database containing information on projects managed through the database. In particular, the component may return information to the web application relating to a project with the identifier of 123.

At step 408, process 400 (e.g., using one or more components described above) generates for display the web page with the set of web applications by displaying the component associated with each web application in the set of web applications. Display Subsystem 112 generates for display the web page with the set of web applications by displaying the component associated with each web application in the set of web applications. Displaying a set of micro frontends on a web page involves orchestrating the integration of individual micro frontend modules into a cohesive user interface. The system may cause a shell or container application to be loaded in the user's browser, which acts as the main entry point for the micro front end web applications. The shell then fetches the required micro front end components to supply web applications with content, which are often hosted on separate servers or repositories, using asynchronous HTTP requests or module loaders like webpack. Once the micro front end components are fetched, they are dynamically loaded into the shell's DOM (Document Object Model), usually within designated container elements or components. This loading process may include initializing the micro frontends, passing configuration or state data, and setting up communication channels between the shell and micro frontends through well-defined APIs or messaging protocols. Finally, the shell orchestrates the layout and rendering of the micro frontends within the user interface, ensuring they work together seamlessly while maintaining their independence and encapsulation. Techniques like lazy loading, preloading, and caching can be employed to optimize performance and user experience when dealing with multiple web applications on a single web page.

At step 410, process 400 (e.g., using one or more components described above) determines a requested update to a first web application in response to detecting a first user action. In response to detecting a first user action, Web Application Subsystem 114 determines a requested update to a first web application in the set of web applications. For example, the first user action may interact with the web page to indicate a requested change. For example, the first user action may be a cursor click on an element corresponding to a request for expanded content for an existing component for a web application. In another example, the first user action may indicate to close a tab in a display of a web application. The system may determine a requested update by corresponding the user action to a component in a web application and determining a functionality corresponding to the component based on the user action. Functionalities may include adding content, removing content, replacing content, and dynamically updating content. The system may determine the functionality based on pre-programmed logic of the web application or the component. In some embodiments, the system may determine to replace a component for the web application.

At step 412, process 400 (e.g., using one or more components described above) identifies a substitute component for the first web application based on the requested update. The substitute component contains content or programming corresponding to the requested update. Based on the requested update, Web Application Subsystem 114 identifies a substitute component for the first web application. The substitute component contains, for example, content or programming corresponding to the requested update. The system may select the substitute component by, for example, determining capability and functional requirements of the first web application. The system may determine capability requirements of the web page. For example, an amount of network bandwidth allocated to the first web application, a CPU power percentage, an I/O count allocation, and other computational limits may restrict the range of substitute components suitable for the web application. Additionally, the system determines a software compatibility requirement of the web page, including inter-operability requirements with other web applications in the micro front end, and selects a substitute component that satisfies the software compatibility requirement. For example, the system may select a component programmed using the Angular framework if the web application has other components also using the Angular framework. Additionally or alternatively, the system may select the substitute component based on functional requirements. The functional requirements may describe content to be displayed by the substitute component and responses to be made in response to user actions. For example, a functional requirement for the substitute component may be that a graphic must be interactable within the substitute component, being able to reflect different information in response to user input.

At step 414, process 400 (e.g., using one or more components described above) adjusts a query parameter associated with the first web application to correspond to a deep link for the substitute component. The system adjusts a query parameter (e.g., from Query Parameters 134) associated with the first web application to correspond to a deep link for the substitute component. For example, the system may re-select a query parameter from the set of query parameters. For example, whereas a web application used a query parameter of "projects?id=123" to identify a component for supplying information before the requested change, the system may change the query parameter to "projects?id=145" in response to a requested change that, for example, indicates different content should be displayed. The system may fetch a substitute in the list of components available to the web application, and find an associated query parameter of the substitute component. In some embodiments, each web application is associated with a set of query parameters, where the set of query parameters indicate suitable components for the web application. For example, the set of query parameters may correspond to components that are selected for compliance with functional and/or content requirements of the web application. For example, the system may rank the set of components for a web application based on a measure of suitability and/or computational load.

At step 416, process 400 (e.g., using one or more components described above) updates the content of the web page with the adjusted query parameter. The updated content of the web page still maintains the first uniform resource locator. Display Subsystem 112 updates the content of the web page with the adjusted query parameter, wherein the updated content of the web page maintains the first uniform resource locator. For example, the system may use a deep link corresponding to the adjusted query parameter to provide the web application with content from the substitute component. In some embodiments, the web page may automatically reflect the content without the need to re-load or re-route at the client side. For example, the server may provide a different response to the web application based on the adjusted query parameter. In some embodiments, the adjusted query parameter causes the system to communicate with a different server in order to retrieve the content of the substitute component. The web page may update its display in a user interface. On the client side, web applications can utilize client-side scripting languages like JavaScript to dynamically update the user interface with substitute content based on the server response.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for determining components for a micro front end of a webpage using deep linking through query parameters, comprising: determining a set of web applications to be included in a micro front end to generate for display information for a web page, wherein the web page is associated with a first uniform resource locator and a first set of query parameters; for each web application in the set of web applications: determining a set of components, wherein a component provides a web application with web elements, display content, and programmed instructions, and wherein each component is associated with a deep link; using a query parameter in the first set of query parameters to associate the web application with a component by sub-routing the query parameter to correspond to the deep link; generating for display the web page with the set of web applications by generating for display the component associated with each web application in the set of web applications; in response to detecting a first user action, determining a requested update to a first web application in the set of web applications; based on the requested update, identifying a substitute component for the first web application, wherein the substitute component contains content or programming corresponding to the requested update; adjusting a query parameter associated with the first web application to correspond to a deep link for the substitute component; and updating the content of the web page based on the adjusted query parameter, wherein the updated content of the web page maintains the first uniform resource locator.

2. A method for displaying components on a micro front end webpage using deep linking through query parameters, comprising: determining a set of web applications to be included in a micro front end to generate for display information for a web page, wherein the web page is associated with a first uniform resource locator and a first set of query parameters; for each web application in the set of web applications: determining a set of components, wherein a component supplies its web application with content, and wherein each component is associated with a deep link; and using a query parameter in the first set of query parameters to associate the web application with a component by sub-routing the query parameter to correspond to the deep link; generating for display the web page with the set of web applications by displaying the component associated with each web application in the set of web applications; in response to detecting a first user action, determining a requested update to a first web application in the set of web applications; based on the requested update, identifying a substitute component for the first web application, wherein the substitute component contains content or programming corresponding to the requested update; adjusting a query parameter associated with the first web application to correspond to a deep link for the substitute component; and updating the content of the web page with the adjusted query parameter, wherein the updated content of the web page maintains the first uniform resource locator.

3. A method comprising: determining a set of web applications to be displayed in a micro front end to generate information for display on a web page, wherein the web page is associated with a first uniform resource locator and a first set of query parameters; for each web application in the set of web applications, using a query parameter in the first set of query parameters to associate the web application with a component by sub-routing the query parameter to correspond to a deep link for the component; generating for display the web page with the set of web applications by transmitting the component associated with each web application in the set of web applications; in response to detecting a first user action, determining a requested update to a first web application in the set of web applications; based on the requested update, adjusting a query parameter associated with the first web application to correspond to a deep link for a substitute component; and updating displayed content of the web page with the adjusted query parameter, wherein the updated displayed content of the web page maintains the first uniform resource locator.

4. The method of any one of the preceding embodiments, further comprising: detecting a second user action for a second web application; based on the second user action, determining a desired change comprising removal of first displayed content; selecting one or more components corresponding to the first displayed content; and removing query parameters from the second web application corresponding to the one or more components.

5. The method of any one of the preceding embodiments, further comprising: identifying a replacement component, wherein the replacement component comprises second display content; associating a replacement query parameter that deep links to the replacement component with the second web application; and updating the web page with the second web application sub-routed using the replacement query parameter to generate the second display content.

6. The method of any one of the preceding embodiments, wherein the components for a web application are selected based on capability and functional requirements of the web application.

7. The method of any one of the preceding embodiments, wherein selecting components based on capability comprises: determining a software compatibility requirement of the web page; determining a processing power and a network bandwidth associated with the micro front end; determining inter-operability requirements with other web applications in the micro front end; and selecting components that satisfy the software compatibility requirement, the processing power, the network bandwidth, and the inter-operability requirements.

8. The method of any one of the preceding embodiments, wherein selecting components based on functional requirements comprises: determining a visual requirement for the web application; determining a computing requirement for the web application, wherein the computing requirement specifies responses to be made to user actions; determining a data requirement for the web application, wherein the data requirement specifies information to be displayed in the web application; and selecting components that satisfy the visual requirement, the computing requirement, and the data requirement.

9. The method of any one of the preceding embodiments, wherein updating the display for the web page comprises: removing a displayed component from the micro front end; transmitting the adjusted query parameter to a host server to request the substitute component; receiving one or more web elements from the host server in response; and causing the web application to display the one or more web elements in place of the displayed component.

10. The method of any one of the preceding embodiments, further comprising: receiving a user request to add a web application to the web page; retrieving a set of query parameters corresponding to a set of components associated with the web application; based on a display component in the set of components, choosing a query parameter from the set of query parameters; and displaying the web application in the micro front end by sub-routing the query parameter to correspond to a deep link for the display component.

11. The method of any one of the preceding embodiments, further comprising: based on the first user action, saving the set of query parameters in association with a user interest profile; and based on the user interest profile to recommend web applications, generating for display on the web page a first suggested web application and a first suggested component for the first suggested web application.

12. The method of any one of the preceding embodiments, wherein using a query parameter to associate the web application with a component comprises: determining an application programming interface corresponding to the component; selecting a query parameter from the first set of query parameters to access the application programming interface, wherein the query parameter allows the web application to communicate with the application programming interface; and causing the web application to access the component for display using the query parameter.

13. One or more non-transitory computer-readable media storing instructions that, when executed by a data processing apparatus, cause the data processing apparatus to perform operations comprising those of any of embodiments 1-12.

14. A system comprising one or more processors; and memory storing instructions that, when executed by the processors, cause the processors to effectuate operations comprising those of any of embodiments 1-12.

15. A system comprising means for performing any of embodiments 1-12.

What is claimed is:

1. A system for determining components for a micro front end of a webpage using deep linking through query parameters, comprising:
one or more processors; and
one or more non-transitory, computer-readable media comprising instructions that, when executed by the one or more processors, cause operations comprising:
determining a set of web applications to be included in a micro front end to generate for display information for a web page, wherein the web page is associated with a first uniform resource locator and a first set of query parameters;
for each web application in the set of web applications:
determining a set of components, wherein a component provides a web application with web elements, display content, and programmed instructions, and wherein each component is associated with a deep link;
using a query parameter in the first set of query parameters to associate the web application with a component by sub-routing the query parameter to correspond to the deep link;
generating for display the web page with the set of web applications by generating for display the component associated with each web application in the set of web applications;
in response to detecting a first user action, determining a requested update to a first web application in the set of web applications;
based on the requested update, identifying a substitute component for the first web application, wherein the substitute component contains content or programming corresponding to the requested update;
adjusting a query parameter associated with the first web application to correspond to a deep link for the substitute component; and
updating the content of the web page based on the adjusted query parameter, wherein the updated content of the web page maintains the first uniform resource locator.

2. A method for displaying components on a micro front end webpage using deep linking through query parameters, comprising:
determining a set of web applications to be included in a micro front end to generate for display information for a web page, wherein the web page is associated with a first uniform resource locator and a first set of query parameters;
for each web application in the set of web applications:
determining a set of components, wherein a component supplies its web application with content, and wherein each component is associated with a deep link; and
using a query parameter in the first set of query parameters to associate the web application with a component by sub-routing the query parameter to correspond to the deep link;
generating for display the web page with the set of web applications by displaying the component associated with each web application in the set of web applications;
in response to detecting a first user action, determining a requested update to a first web application in the set of web applications;
based on the requested update, identifying a substitute component for the first web application, wherein the substitute component contains content or programming corresponding to the requested update;
adjusting a query parameter associated with the first web application to correspond to a deep link for the substitute component; and updating the content of the web page with the adjusted query parameter, wherein the updated content of the web page maintains the first uniform resource locator.

3. The method of claim 2, wherein using a query parameter to associate the web application with a component comprises:
   determining an application programming interface corresponding to the component;
   selecting a query parameter from the first set of query parameters to access the application programming interface, wherein the query parameter allows the web application to communicate with the application programming interface; and
   causing the web application to access the component for display using the query parameter.

4. The method of claim 2, further comprising:
   detecting a second user action for a second web application;
   based on the second user action, determining a desired change comprising removal of first displayed content;
   selecting one or more components corresponding to the first displayed content; and
   removing query parameters from the second web application corresponding to the one or more components.

5. The method of claim 4, further comprising:
   identifying a replacement component, wherein the replacement component comprises second display content;
   associating a replacement query parameter that deep links to the replacement component with the second web application; and
   updating the web page with the second web application sub-routed using the replacement query parameter to generate the second display content.

6. The method of claim 2, wherein the components for a web application are selected based on capability and functional requirements of the web application.

7. The method of claim 6, wherein selecting components based on capability comprises:
   determining a software compatibility requirement of the web page;
   determining a processing power and a network bandwidth associated with the micro front end;
   determining inter-operability requirements with other web applications in the micro front end; and
   selecting components that satisfy the software compatibility requirement, the processing power, the network bandwidth, and the inter-operability requirements.

8. The method of claim 6, wherein selecting components based on functional requirements comprises:
   determining a visual requirement for the web application;
   determining a computing requirement for the web application, wherein the computing requirement specifies responses to be made to user actions;
   determining a data requirement for the web application, wherein the data requirement specifies information to be displayed in the web application; and
   selecting components that satisfy the visual requirement, the computing requirement, and the data requirement.

9. The method of claim 2, wherein updating the display for the web page comprises:
   removing a displayed component from the micro front end;
   transmitting the adjusted query parameter to a host server to request the substitute component;
   receiving one or more web elements from the host server in response; and
   causing the web application to display the one or more web elements in place of the displayed component.

10. The method of claim 2, further comprising:
    receiving a user request to add a web application to the web page;
    retrieving a set of query parameters corresponding to a set of components associated with the web application;
    based on a display component in the set of components, choosing a query parameter from the set of query parameters; and
    displaying the web application in the micro front end by sub-routing the query parameter to correspond to a deep link for the display component.

11. The method of claim 2, further comprising:
    based on the first user action, saving the set of query parameters in association with a user interest profile; and
    based on the user interest profile to recommend web applications, generating for display on the web page a first suggested web application and a first suggested component for the first suggested web application.

12. One or more non-transitory computer-readable media comprising instructions that, when executed by one or more processors, cause operations comprising:
    determining a set of web applications to be displayed in a micro front end to generate information for display on a web page, wherein the web page is associated with a first uniform resource locator and a first set of query parameters;
    for each web application in the set of web applications, using a query parameter in the first set of query parameters to associate the web application with a component by sub-routing the query parameter to correspond to a deep link for the component;
    generating for display the web page with the set of web applications by transmitting the component associated with each web application in the set of web applications;
    in response to detecting a first user action, determining a requested update to a first web application in the set of web applications;
    based on the requested update, adjusting a query parameter associated with the first web application to correspond to a deep link for a substitute component; and
    updating displayed content of the web page with the adjusted query parameter, wherein the updated displayed content of the web page maintains the first uniform resource locator.

13. The one or more non-transitory computer-readable media of claim 12, wherein using a query parameter to associate the web application with a component comprises:
    determine an application programming interface corresponding to the component;
    select a query parameter from the first set of query parameters to access the application programming interface, wherein the query parameter allows the web application to communicate with the application programming interface; and
    causing the web application to access the component for display using the query parameter.

14. The one or more non-transitory computer-readable media of claim 12, wherein the operations further comprise:
    detecting a second user action for a second web application;
    based on the second user action, determining a desired change comprising removal of first displayed content;

selecting one or more components corresponding to the first displayed content; and removing query parameters from the second web application corresponding to the one or more components.

15. The one or more non-transitory computer-readable media of claim 14, wherein the operations further comprise:
   finding a replacement component, wherein the replacement component comprises second display content;
   associating a replacement query parameter that deep links to the replacement component with the second web application; and
   updating the display for the web page with the second web application sub-routed using the replacement query parameter to display the second display content.

16. The one or more non-transitory computer-readable media of claim 12, wherein the components for a web application are selected based on capability and functional requirements of the web application.

17. The one or more non-transitory computer-readable media of claim 16, wherein selecting components based on capability comprises:
   determining a software compatibility requirement of the web page;
   determining a processing power and a network bandwidth associated with the micro front end;
   determining inter-operability requirements with other web applications in the micro front end; and
   selecting components that satisfy the software compatibility requirement, the processing power, the network bandwidth, and the inter-operability requirements.

18. The one or more non-transitory computer-readable media of claim 16, wherein selecting components based on functional requirements comprises:
   determining a visual requirement for the web application;
   determining a computing requirement for the web application, wherein the computing requirement specifies responses to be made to user actions;
   determining a data requirement for the web application, wherein the data requirement specifies information to be displayed in the web application; and
   selecting components that satisfy the visual requirement, the computing requirement, and the data requirement.

19. The one or more non-transitory computer-readable media of claim 12, wherein updating the display for the web page comprises:
   removing a displayed component from the micro front end;
   transmitting the adjusted query parameter to a host server to request the substitute component;
   receiving one or more web elements from the host server in response; and
   causing the web application to display the one or more web elements in place of the displayed component.

20. The one or more non-transitory computer-readable media of claim 12, wherein the operations further comprise:
   receiving a user request to add a web application to the web page;
   retrieving a set of query parameters corresponding to a set of components associated with the web application;
   based on a display component in the set of components, choosing a query parameter from the set of query parameters; and
   displaying the web application in the micro front end by sub-routing the query parameter to correspond to a deep link for the display component.

* * * * *